(12) United States Patent
Srinivasan et al.

(10) Patent No.: US 6,823,507 B1
(45) Date of Patent: Nov. 23, 2004

(54) DETECTION OF MEMORY-RELATED ERRORS IN COMPUTER PROGRAMS

(75) Inventors: Ravi Srinivasan, Bangalore (IN); Usha Kiran, Bangalore (IN); Navin Kumar Sinha, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 708 days.

(21) Appl. No.: 09/587,924

(22) Filed: Jun. 6, 2000

(51) Int. Cl.$^7$ .................................................. G06F 9/45
(52) U.S. Cl. ...................... 717/152; 717/151; 717/154; 717/158
(58) Field of Search ................................. 717/146, 140, 717/152, 151, 154, 158; 395/708, 705

(56) References Cited

U.S. PATENT DOCUMENTS

| | | | |
|---|---|---|---|
| 5,535,329 A | | 7/1996 | Hastings |
| 5,590,329 A | * | 12/1996 | Goodnow et al. .......... 717/144 |
| 5,644,709 A | | 7/1997 | Austin |
| 5,842,019 A | | 11/1998 | Kolawa et al. |
| 6,085,029 A | | 7/2000 | Kolawa et al. |
| 6,085,035 A | * | 7/2000 | Ungar ........................ 717/116 |
| 6,427,234 B1 | * | 7/2002 | Chambers et al. .......... 717/140 |
| 6,560,774 B1 | * | 5/2003 | Gordon et al. .............. 717/146 |

* cited by examiner

*Primary Examiner*—Kakali Chaki
*Assistant Examiner*—Qamrun Nahar
(74) *Attorney, Agent, or Firm*—Anthony V.S. England; T. Rao Coca; Manny W. Schecter

(57) ABSTRACT

A method, an apparatus, and a computer program product are disclosed for detecting memory-related errors in a computer program during compiling of the computer program. In the method, static analysis is performed upon a computer program. One or more conditions in the computer program are computed based on the static analysis. Each condition is a test for checking a memory access in the computer program and can be either a pre- or post-condition. The validity of each condition in the computer program is then evaluated. If the evaluation is determinate during compiling, the presence or absence of memory-related errors in the computer program is reported. A condition is determinate if the condition is valid or invalid during compiling. Otherwise, computer code based on the condition is generated for incorporation in the computer program for run-time detection of memory-related errors.

54 Claims, 8 Drawing Sheets

DETECTION OF MEMORY-RELATED ERRORS IN COMPUTER PROGRAMS

FIELD OF THE INVENTION

The present invention relates to computer programming techniques, and more particularly to techniques for detecting computer memory access errors of a computer program.

BACKGROUND

Errors arising from improper usage of memory are the most frequently occurring and one of the most intractable class of programming errors. The difficulty in tracking and fixing memory-related errors arises partially because the symptoms of the bug are usually far removed from the actual source of the bug and partially because the symptoms of the bug themselves appear inconsistently. Therefore, debugging of memory management errors requires a systematic, algorithmic approach.

A number of existing tools that aid in the process of debugging of memory-management errors use the technique of inserting run-time tests, either in the source code or in the object code, to validate each memory access during the execution of the program. This straightforward approach implicitly assumes that all memory accesses in the program are independent and unrelated and therefore need to be checked individually, which, unfortunately is not the case in real programs. Also, since most of these techniques tend to validate each memory access in the program, they often slow down the execution of the program by a huge factor; and hence, prove to be very cumbersome to use for industrial-sized programs particularly.

U.S. Pat. No. 5,644,709, issued on 1 Jul. 1997 to Austin describes a method for detecting memory-access errors that occur while executing a computer program (i.e., the errors are only detected at run-time). The method seeks to identify both spatial errors and temporal errors. In the case of a data object, spatial and temporal attributes are associated with a pointer to that data object. On the occurrence of a dereference by a pointer, a memory access check is performed to determine whether the dereference falls outside the valid address range for the data object, or outside a valid time period for the data object. If the dereference falls outside either range, a respective spatial or temporal error is flagged. Thus, U.S. Pat. No. 5,644,709 is concerned with catching memory-access errors only during program code execution (i.e., at run-time).

U.S. Pat. No. 5,644,709 further teaches a necessary preliminary method of taking a source-level program file, which in the normal course of events is compiled, interpreted or translated into object-level code, and adding to that compiling/interpreting/translating process an extended pointer representation. This pointer representation contains the value of the pointer as well as one or more object attributes, which describe the location, size, and lifetime of the pointer reference. This extended form of pointer allows the dereferencing process on occurrence of a memory access to check for spatial and temporal errors.

The approach taught by U.S. Pat. No. 5,644,709 has drawbacks, however, including the fact that errors resulting from source code programming faults are only detected at run-time. While such errors can be detected, the problem of debugging them still exists.

Conventional techniques insert run-time tests in program code (either source code or object code) to perform run-time debugging of memory errors. However, this introduces significant inefficiencies into the debugging process. Thus, a need clearly exists for an improved method of detecting memory-related errors that minimizes detection at run-time of a compiled computer program.

SUMMARY

The aspects of the invention perform a static analysis of program source code in an attempt to validate memory accesses in the program at compile-time, for each given program point. Thus the presence or absence of errors can be reported at compile-time. In cases where no conclusion can be reached by the static analysis (e.g. due to the presence of variables whose values cannot be inferred statically), then supplemental run-time tests are provided for validating such memory accesses at run-time.

The aspects of the invention therefore seek to provide a practical and efficient solution to the automatic detection of memory-related errors, using compile-time program analysis to attempt to reduce the extent of run-time testing.

In accordance with a first aspect of the invention, there is disclosed a method of detecting memory-related errors in a computer program during compiling of the computer program. In the method, static analysis is performed upon a computer program. At least one condition in the computer program is computed dependent upon the static analysis. Preferably, a condition is a test for checking a memory access in the computer program to and can be a pre-condition and/or a post-condition. The validity of each condition in the computer program is then evaluated. If the evaluation of a condition is determinate during compiling of the computer program, the presence or absence of memory-related errors in the computer program is reported. Preferably, a condition is determinate if the condition is valid or invalid. Otherwise, if the evaluation of a condition is indeterminate during compiling of the computer program, computer code based on the condition for incorporation in the computer program is generated for run-time detection of memory-related errors in the computer program. In this manner, generated computer code is minimized for run-time detection of memory-related errors in the computer program.

Preferably, the method includes the steps of determining an interrelationship between two or more memory accesses using the static analysis and generating a single condition in the computer program for two or more related memory accesses to minimize the number of conditions to be evaluated. The memory access can be made in the statically allocated memory or the dynamically allocated memory.

Preferably, the method includes the step of assigning at least one precondition to each statement in the computer program that must be satisfied for the computer program to execute without the memory-related errors. The pre-condition depends on one of the following: a memory-related operation in a statement in the computer program; a language restriction imposed on the memory-related operation; a predetermined error capable of being tested for; and a set of pre-conditions for a procedure call, the set being derived from static analysis of source code for the called procedure or being defined by a user. A post-condition is a check on the effect of a statement of the computer program on a memory space and can depend on one of the following: a memory-related operation at the statement of the computer program; the effect of the memory-related operation on the memory space defined by language semantics; and a set of post-conditions for a procedure call, the set being derived from static analysis of source code for the called procedure or being defined by a user.

In accordance with a second aspect of the invention, there is disclosed an apparatus for detecting memory-related errors in a computer program during compiling of the computer program. The apparatus includes a performing device, a computing device, an evaluating device, a reporting device, and a generating device. The performing device performs static analysis upon a computer program. The computing device computes at least one condition in the computer program dependent upon the static analysis. The evaluating device evaluates the validity of the at least one condition in the computer program. The reporting device reports the presence or absence of memory-related errors in the computer program if the evaluation of a condition is determinate during compiling of the computer program. The generating device generates computer code based on the at least one condition for incorporation in the computer program for run-time detection of memory-related errors in the computer program if the evaluation of a condition is indeterminate during compiling of the computer program. In this manner, the generated computer code is minimized for run-time detection of memory-related errors in the computer program.

In accordance with a third aspect of the invention, there is disclosed a computer program product having a computer readable medium having a computer program recorded therein for detecting memory-related errors in a computer program during compiling of the computer program. The computer program product includes:

a computer program code module for performing static analysis upon a computer program;

a computer program code module for computing at least one condition in the computer program dependent upon the static analysis;

a computer program code module for evaluating the validity of the at least one condition in the computer program;

a computer program code module for reporting the presence or absence of memory-related errors in the computer program if the evaluation of a condition is determinate during compiling of the computer program; and a computer program code module for generating computer code based on the at least one condition for incorporation in the computer program for run-time detection of memory-related errors in the computer program if the evaluation of a condition is indeterminate during compiling of the computer program, whereby the generated computer code is minimized for run-time detection of memory-related errors in the computer program.

In accordance with a fourth aspect of the invention, there is disclosed a method of compiling a computer program. In the method, source code of the computer program is converted into intermediate code of the computer program. The intermediate code, of the computer program is optimized, in which memory-related errors are detected. In the optimization, memory-related errors are detected in the intermediate code of the computer program using static analysis. In the optimization, any memory-related errors in the computer program are reported that are determinate during compiling of the computer program. In the optimization, computer code is generated to test for any memory-related errors in the computer program that are indeterminate during compiling of the computer program. The generated computer code is incorporated in optimized intermediate code of the computer program. The optimized intermediate code is then converted into machine executable code of the computer program.

Preferably, in the detecting step, static analysis is performed upon the intermediate code of the computer program. At least one condition in the intermediate code of the computer program is computed dependent upon the static analysis. The validity of the at least one condition in the intermediate code of the computer program is evaluated.

Each condition checks for a memory access in the computer program. Each condition can be a pre-condition and/or a post-condition. Preferably, the method also includes the steps of determining an interrelationship between two or more memory accesses using the static analysis and generating a single condition in the intermediate code of the computer program for two or more related memory accesses to minimize the number of conditions to be evaluated. A pre-condition can be assigned to each statement in the computer program that must be satisfied for the computer program to execute without the memory-related errors. A post-condition is a check on the effect of a statement of the computer program on a memory space. A condition is determinate if the condition is valid or invalid.

In accordance with a fifth aspect of the invention, there is disclosed an apparatus for compiling a computer program. The apparatus includes a converting device, an optimizing device, and a converting device. The converting device converts source code of the computer program into intermediate code of the computer program. The optimizing device optimizes the intermediate code of the computer program. The converting device converts the optimized intermediate code into machine executable code of the computer program. The optimizing device further includes a detecting device, a reporting device, and a generating device. The detecting device detects memory-related errors in the intermediate code of the computer program using static analysis. The reporting device reports any memory-related errors in the computer program that are determinate during compiling of the computer program. The generating device generates computer code to test for any memory-related errors in the computer program that are indeterminate during compiling of the computer program, the generated computer code incorporated in optimized intermediate code of the computer program.

In accordance with a sixth aspect of the invention, there is disclosed a computer program product having a computer readable medium having a computer program recorded therein for compiling a computer program. The computer program product includes:

a computer program code module for converting source code of the computer program into intermediate code of the computer program;

a computer program code module for optimizing the intermediate code of the computer program, the optimizing module including:

a computer program code module for detecting memory-related errors in the intermediate code of the computer program using static analysis;

a computer program code module for reporting any memory-related errors in the computer program that are determinate during compiling of the computer program; and a computer program code module for generating computer code to test for any memory-related errors in the computer program that are indeterminate during compiling of the computer program, the generated. computer code incorporated in optimized intermediate code of the computer program; and a computer program code module for converting the optimized intermediate code into machine executable code of the computer program.

BRIEF DESCRIPTION OF THE DRAWINGS

Embodiments of the invention are described hereinafter with reference to the accompanying drawings, in which.

DETAILED DESCRIPTION

Figure 1:
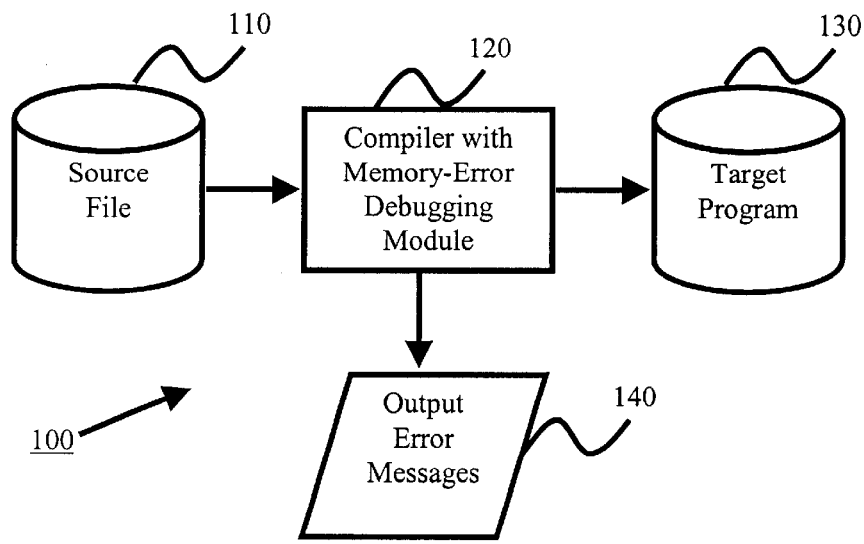
FIG. 1 is a block diagram of a compiler in accordance with a first embodiment of the invention.

A method, an apparatus, and a computer program product for detecting memory-related errors in a computer program during compiling of the computer program are described. Further, a method, an apparatus, and a computer program product for compiling a computer program are disclosed. In the following description, numerous details are set forth including specific content-addressing techniques like computer programming languages such as C and C++, for example. It will be apparent to one skilled in the art, however, that the present invention may be practised without these specific details. In other instances, well-known features are not described in detail so as not to obscure the present invention.

The detailed description is organised as follows:

1. Overview
2. First Embodiment of the Invention
3. Important Features
4. Memory-Related Errors Handled
5. Memory and Program Models and Analysis Procedure
6. Static Analysis Technique
7. Further Details of the Technique
8. Computer Implementation In the following description, components of the memory-related error detection and compiling method are described as modules. A module, and in particular its functionality, can be implemented in either hardware or software. In the software sense, a module is a process, program, or portion thereof, that usually performs a particular function or related functions. In the hardware sense, a module is a functional hardware unit designed for use with other components or modules. For example, a module may be implemented using discrete electronic components, or it can form a portion of an entire electronic circuit such as an Application Specific Integrated Circuit (ASIC). Numerous other possibilities exist. Those skilled in the art will appreciate that the system can also be implemented as a combination of hardware and software modules.

1. Overview

The embodiments of the invention perform a static analysis of the inter-relationships of memory accesses in a computer program to eliminate certain run-time tests. Such an analysis seeks to examine the validity of memory accesses in each statement of the computer program. If the conditions required by a statement can be resolved as either valid or invalid (i.e., determinate) from the compile-time information, the presence or absence of the error can be reported to the user at compile-time itself. For cases where no conclusion can be reached (i.e. indeterminate), run-time tests for validating the memory access are generated and included in the computer program. The conditions might be indeterminate, for example, due to the presence of variables having values that are not known at compile-time. Still further, the embodiments do not assume that all memory accesses in a computer program are independent and unrelated. Consequently, the interrelationships between memory accesses are checked to reduce the number, of tests that must be performed.

Since it is possible to fall back on generating run-time tests, no accuracy is lost in the debugging process according to the embodiments of the invention. The worst-case performance does not perform worse than conventional techniques that validate each memory access at run-time. However, memory accesses in real programs do tend to be inter-related and therefore present considerable scope for eliminating, or at least minimizing, the run-time tests for memory-related errors, thereby making the debugging process in accordance with the embodiments of the invention more efficient.

To illustrate a benefit of the embodiments of the invention, a simple example is given in Table 1.

TABLE 1

```
    typedef struct
    {
        boolean p1;
        boolean p2;
        boolean p3;
        boolean p4;
    } mystruct;
1   void myproc(mystruct* p)
2   {
3       if (p -> p1)
4       {
5           if (p -> p2)
6           {
7               if (p -> p3)
8               {
9                   if (p -> p4)
10                  {
11                      printf("All values are true\n");
12                  }
13              }
14          }
15      }
16  }
```

In Table 1, a structure mystruct and a procedure myproc that is passed a structure of type mystruct are defined. A straightforward, conventional approach of inserting run-time tests would test for the validity of the pointer 'p' in the procedure myproc in all the instances where this pointer is dereferenced (i.e., at line numbers 3, 5, 7 and 9). However, in marked contrast, the embodiments of the invention are able to determine that all these accesses are related and that a single test for the pointer access at line number 3 suffices to evaluate the validity of all the accesses in the succeeding blocks.

Another example is given in Table 2.

TABLE 2

```
1   main( )
2   {
3   int a[10];
4   int I, n;
5   scanf("%d",&n);
6   for (I = 0; I < n; I++)
7       {
8           a[I] = I;
9       }
10  }
```

Table 2 illustrates a program containing an array of integers that are assigned values in a FOR loop. Again, if run-time tests are performed indiscriminately in accordance with conventional techniques, the array access at line number 8 is checked in each iteration of the FOR loop up to n times. In marked contrast, the embodiments of the invention summarize the loop at line numbers 6–9 in that the array 'a' is accessed in the range [0 . . . n]. Since for validity, this should be a sub-range of the array size [0 . . . 9], one simply needs to ensure the condition (n<=9) after the value of n has been read in at line 5. If other compiler optimizations (e.g. constant propagation) can evaluate the possible values of 'n' and reach a definite conclusion about the validity of this condition at compile-time, then no run-time tests are required.

Thus, the embodiments of the invention perform an extensive static analysis of a given source program to reduce the amount of run-time testing required while debugging memory-related errors. The analysis computes the conditions that must be satisfied at each program point for an error-free memory access. These conditions are evaluated to verify whether they are valid in the context of the program. If the evaluation can be completed based on the available compile-time information, the presence or absence of errors can be reported at compile-time itself. If no conclusion can be reached through compile-time analysis, the partially-evaluated expressions are used to generate code for run-time testing. In this manner, the embodiments of the invention solve the problem of automatic detection of memory-related bugs caused due to programming errors using static analysis of the source code to validate the memory accesses in the program at compile-time. The embodiments provide a practical and efficient solution to the automatic detection of memory-related errors, without losing on the accuracy of the tests. The aim is to use compile-time program analysis to reduce the extent of run-time testing to an irreducible minimum.

2. First Embodiment of the Invention

FIG. 1 is a block diagram illustrating a compiler 120 with memory-error debugging module 120 in accordance with a first embodiment of the invention. The compiler 120 generates a target program 130 from a source file 110. By way of example, the source file 110 can be C source code for a computer program, and the target program 130 can be a machine executable program in machine language. The compiler 120 incorporating the memory-error debugging module can output or report 140 error messages for determinate memory-related errors identified using static analysis of the source file 110. The target program 130 can include computer code generated by the debugging module for run-time testing of indeterminate memory accesses that might cause memory-related errors.

Figure 2:
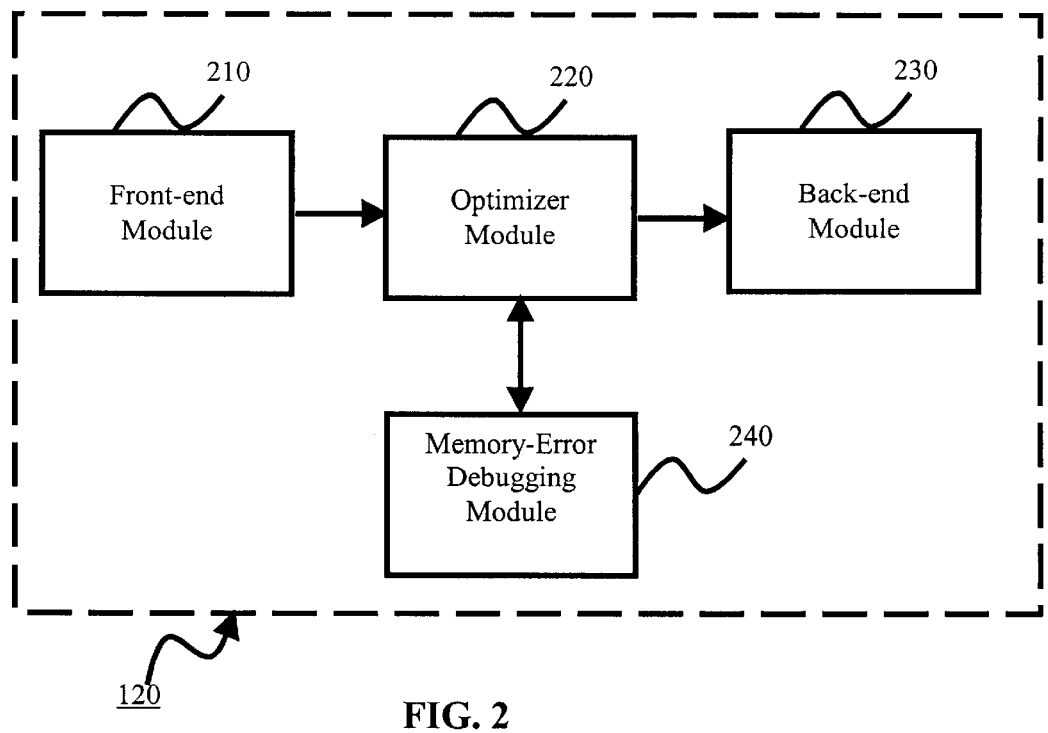
FIG. 2 is a block diagram of a compiler architecture in accordance with the first embodiment of the invention.

FIG. 2 is a more detailed block diagram of the compiler 120 with the memory-error debugging module in accordance with the first embodiment of the invention (shown in dashed lines). The compiler 120 includes a front-end module 210, a back-end module 230, an optimizer module 220, and a memory-error debugging module 240. The front-end module 210 converts source code from a high-level programming language (e.g., C) into an intermediate language. The intermediate code contains information that is not available at other stages of compilation. The optimizer module 220 operates at the intermediate code level, performing various compiler optimizations. The back-end module 230 converts optimized intermediate code into machine language. The embodiments of the invention advantageously utilize the information contained in the intermediate code and used by the optimizer module 220. The intermediate code is used to detect memory-related errors using static analysis of the computer program. In particular, the memory-error debugging module 240 uses a number of data structures (e.g., control flow graph) and compiler analysis techniques (e.g., induction variable analysis for array indexes within loops) that are usually available in the optimizer module 220. While shown as a separate entity in FIG. 2, the debugging module 240 is preferably implemented as part of the optimizer module 220.

Figure 6:
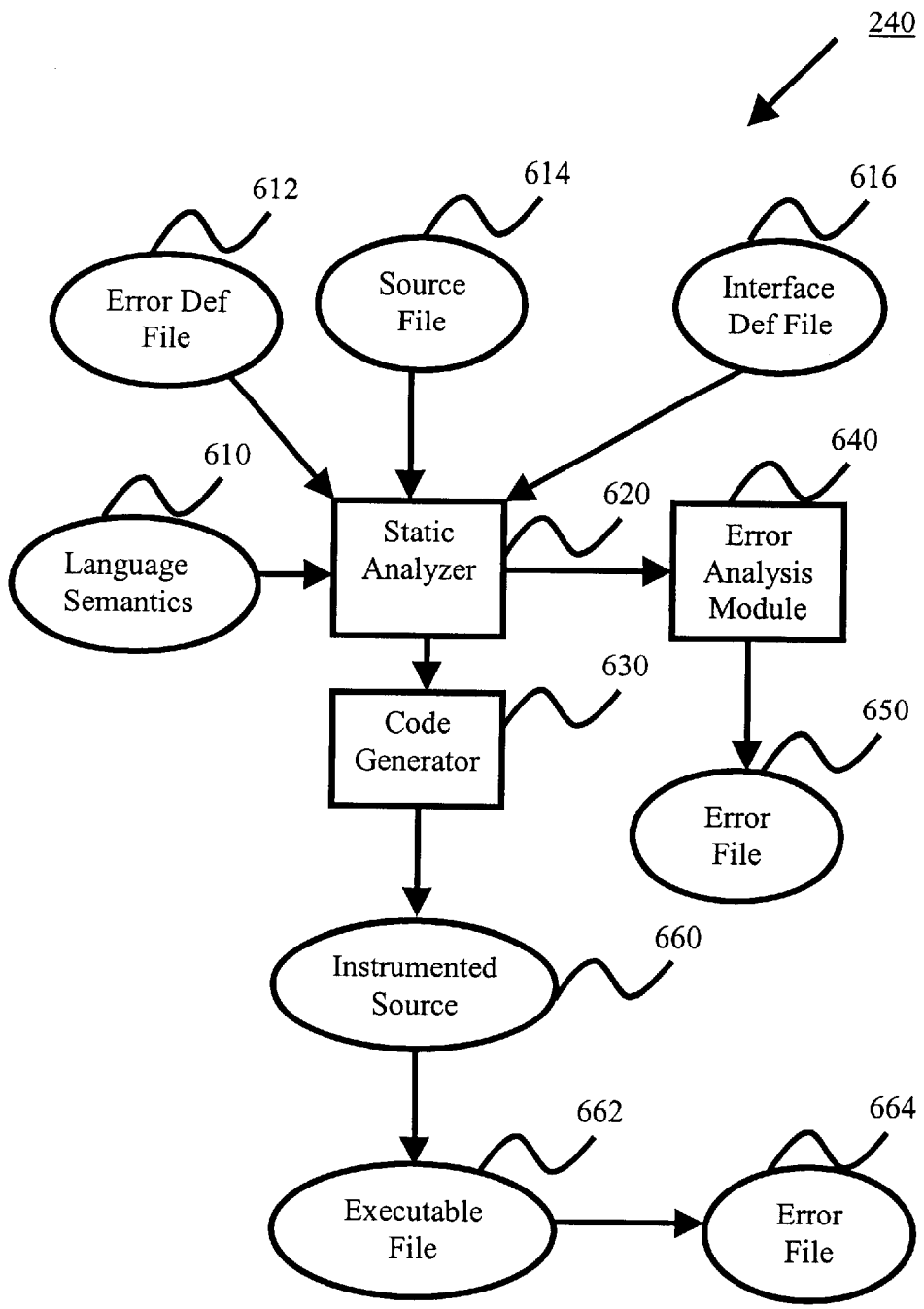
FIG. 6 is a more detailed block diagram of the memory-error debugging module of FIG. 2.

FIG. 6 is a detailed block diagram of the memory-error debugging module 240 of FIG. 2. The memory-error debugging module 240 includes a static analyzer module 620, a code generator module 630, and an error analysis module 640. The static analyzer module 620 is provided the following inputs: language semantics 610, an error definition file 612, a source file 614 (corresponding to source file 110 of FIG. 1), and an interface definition file 616. The static analyzer module 620 provides output to the error analysis module 640 for reporting determinate error testing conditions in the error file 650 produced by module 640. The static analyzer module 620 also provides output to the code generator module 630 where the conditions are indeterminate, which in turn produces instrumented source or intermediate code 660. The source code 660 can be compiled to produce the executable 662, which in turn can produce an error file 664 of run-time errors.

The source file 614 contains the program source code to be analyzed. The error definition file 612 defines the language-specific semantics for memory accesses and the conditions leading to errors. The interface definition file 616 contains pre- and post-conditions for library and third-party function calls. The language semantics 610 contain language definitions regarding the restrictions on and the effects of operations that access the memory space. All of these files 610–616 are provided as inputs to the static analyzer module 620.

The static analyzer module 620 can preferably be implemented as an add-on module to an optimizing compiler, since the analysis also requires a number of compiler analysis and optimizing techniques. The static analyzer module 620 reads in the source program 614 and performs static analysis based on inputs from the language semantics 610, the error definition file 612 and the interface definition file 616. All this analysis is performed on the intermediate language in the same phase as other compiler-analysis and optimizations are carried out. The results of the static analysis are analyzed by an error analysis module 640. Any instances that can be resolved by this module 640 using the compile-time information alone as errors are logged into the error file 650. In those cases where no conclusion can be derived by the compile-time analysis, the relevant information is passed on to the code-generator module 630 to insert run-time tests in the source code. This creates the instrumented source 660. The compilation (not shown) then proceeds on to create the program executable file 662 from this instrumented source code 660. When this executable file 662 is run, tests for the validity of the memory accesses are performed at run-time. If any run-time errors are found, those errors are logged into the error file 664.

Figure 3:
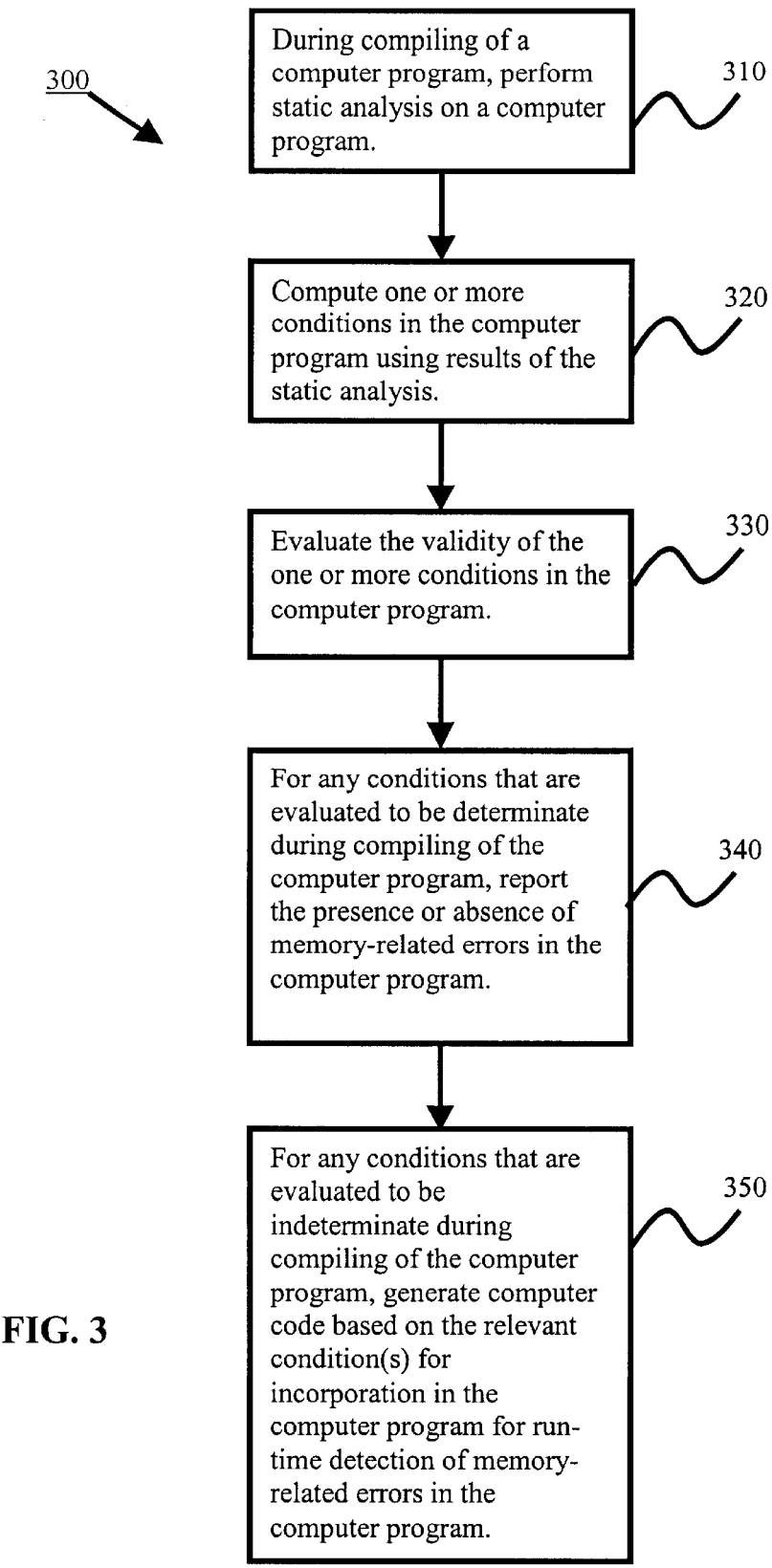
FIG. 3 is a flow diagram illustrating a process for detecting memory-related errors in accordance with the first embodiment of the invention.

FIG. 3 is a flow diagram illustrating the process 300 for detecting memory-related errors in accordance with the first embodiment of the invention. This method is preferably implemented in the memory-error debugging module 240 of FIG. 2. Processing commences in step 310. In step 310, during compiling of the computer program, static analysis is performed on the computer program. In step 320, one or more conditions in the computer program are computed using the results of the static analysis in step 310. In step 330, the validity of each condition in the computer program is evaluated. In step 340, for any conditions that are evaluated to be determinate during compiling of the computer program, the presence or absence of memory-related errors in the program is reported (as shown in block 140 of FIG. 1). In step 350, for any conditions that are evaluated to be indeterminate during compiling of the computer program, computer code based on the relevant condition(s) is generated for incorporation in the computer program for run-time detection of memory-related errors in the computer program.

The detecting process in accordance with the embodiments can be further represented by the steps shown in Table 3.

TABLE 3 i) Assign certain conditions to each program statement (referred to as the preconditions for a statement) that must be satisfied for the program to execute without any memory-related errors.
ii) Evaluate the effect of each program statement on the memory space (referred to as a postcondition of the statement).
iii) For each statement, perform a static verification of the preconditions of that statement in the context of the postconditions generated by the preceding statements to verify whether these preconditions are satisfied. Violation of a precondition at any program point indicates an error at that program point.

Regarding step (i) of Table 3, the preconditions depend on:

(a) memory-related operations in that program statement,
(b) language restrictions imposed upon that operation,
(c) errors that are to be probed for, and
(d) for a procedure call, the conditions required by a procedure call are defined by the procedure's precondition set.

A procedure having source code that is available can be analyzed to obtain a precondition set of the procedure. For library or third-party procedures where the procedure body is not available, preconditions can be defined by the user. Defining the preconditions of a procedure is a simple task that can be done on the basis of the known behavior of the procedure. For example, for a malloc call, the required precondition is that the parameter passed to it is non-negative.

Regarding step (ii) of Table 3, the postconditions depend on:

(a) memory-related operations at that program statement,
(b) effect of these operation on the memory space, as defined by the language semantics, and
(c) for a procedure call, the effects of the procedure call are defined by the procedure's postcondition set.

Postconditions of callee procedures are treated in a similar fashion as the preconditions described hereinbefore. For the library or third-party procedures where the procedure body is not available, postconditions can be defined by the user. Again, defining the postconditions of procedure is a simple task that can be done on the basis of the known behaviour of the procedure. For example, for a malloc call, the required postcondition states that the procedure returns either a null pointer or a memory block of at least the size requested.

Regarding step (iii) of Table 3, the result of the analysis of step (iii) can be broadly categorized as follows:

(a) A precondition required at a given program point are shown to be VALID, indicating that there is no error at a given program point.
(b) A precondition required at a given program point is INVALID, indicating the presence of an error. By storing other necessary information (such as line numbers, etc), the exact cause and point of occurrence of the error can be traced back.
(c) No conclusion can be reached regarding the validity of a given precondition due to the presence of variables having values that could not be inferred statically. This partially evaluated condition is used to instrument the source code to perform a run-time test for validating the memory access, when the program is actually executed.

Further examples regarding definitions of pre-conditions and post-conditions using language semantic definitions are set forth in Tables 4A and 4B. In regards to Table 4A, post-conditions are shown for a few operations for C programming language. In the post-condition rules shown in the table hereinafter, the target entries show only the variable names and the relation entries only show <pointer,target> pair, however, these data structures may contain other fields (not shown). These entries normally contain a number of other fields for storing information about bounds, line numbers of creation, flags indicating the originating basic block, etc.

TABLE 4A

| Statement | Postconditions |
|---|---|
| 1. p = malloc(size) | $T = T \cup \{heap\_n\}$<br>$R = R - \{<p,X>:x \in T\} \cup \{<p, heap\_n> \vee <p, null>\}$<br>p is paired either to a memory allocated object heap_n of the appropriate size or to NULL pointer. |
| 2. p = &a | $T = T \cup \{a\}$<br>$R = R - \{<p,x>:x \in T\} \cup \{<p,a>\}$ |
| 3. p = q | $R = R - \{<p,x>:x \in T\} \cup \{<p,X>, s.t. <q,x> \in R, x \in T\}$ |
| 4. p = p + n | r = Retrieve the entry for p in the table R; update its pointer position field |
| 5. free(p) | <p,x>= Retrieve the entry for p in the table R;<br>$T = T - \{x\}$<br>$R = R - \{<p,x>\}$ |
| 6. pointer variable going out of scope | $R = R - \{<p,x>\}$ |
| 7. target variable going out of scope | $T = T - \{v\}$<br><p,v>= Retrieve the entries for this target variable in the table R;<br>$R = R - \{<p,v>\} \cup \{<p,invalid>\}$ |

Table 4B contains examples of precondition definitions for some operators of the C Programming Language.

TABLE 4B

1. Dereference operator
   *p
   The required condition is: There exists $x \in T$, such that $<p,x> \in R$ and p's current location in x is within proper bounds.

TABLE 4B-continued

2. Pointer comparison operators
   p − q (pointer subtraction operation)
   p C q, where C is a comparison operator ( <, >, <=, >=, . . . )
   The required condition is: both p and q should be pointing to the
   same, valid, memory object. Symbolically, there exists x ∈ T, such
   that <p,x> ∈ R and <q,x> ∈ R
3. Preconditions for the detection of Memory Leak
   For an assignment operator and for a pointer variable going out of
   scope, either:
   A) p does not already point to a heap-allocated object; or
   B) Or, if p does, there should be another pointer variable pointing to
   the same memory block.

3. Important Features

The important features utilized by the method of detecting memory-related errors in accordance with the first embodiment include:

i) The method utilizes compile-time program analysis techniques for validating the memory accesses in the program. In cases where the validity or invalidity of an access can be proven statically, information about the presence or absence of an error is reported at compile-time. In cases where no conclusion can be reached due to the presence of variables having values that are unknown at compile-time, or due to factors dependent on operating system (e.g. the return value of malloc, which can be NULL if sufficient memory is not available), or any other reason, the method instruments the source code for run-time testing. Hence, the method reduces the usage of run-time testing to an irreducible minimum without affecting the accuracy of the testing process. Moreover, there is no need for maintaining extra run-time data structures for keeping track of the memory space.

ii) Although the process increases the compile time of a program, this can be easily bypassed. If the method is used right from the development stage, the procedures of the computer program can be analyzed individually and the summary of the analysis stored in a log file. This summary information can be used for later analysis. Thus, by using the technique on an incremental basis, even the compile-time inefficiency can be reduced to a great extent.

iii) The process describes a general framework that can be implemented for any programming language that involves pointer manipulations.

iv) The user can choose the specific errors the user intends to probe through during a given instance of analysis. Moreover, the user can also choose which procedures and procedure calls to analyze in a given run and which ones to skip.

v) The process can handle third-party and library calls even in cases where the source code of these routines are not available. Information about the 'preconditions' and 'postconditions' of these routines, if available, is sufficient to enable accurate debugging even in the presence of these routines.

vi) The process handles most of the common programming constructs including loops, procedure calls, multiple pointers, pointers within structures, calls through function pointers, etc.

vii) Pointer arithmetic and comparison operators, widely used in C and C++, can be effectively handled by this process.

viii) The process provides complete description of the error diagnostics. The process can accurately locate the exact point of the occurrence as well as the cause of a bug in the source code.

ix) While the usefulness of this process has been demonstrated specifically for the debugging of memory-related errors, the process can be adapted for other kinds of program analysis by redefining the 'preconditions' and 'postconditions' suitably.

x) The process can also be used to generate test cases that provide complete coverage of the source program. In contrast, a major defect of conventional run-time testing techniques is that those techniques can uncover only the specific bugs that are relevant to the test cases being run.

xi) The process can handle statically allocated memory and memory allocated on the stack, as well as the dynamically allocated memory, unlike a number of conventional run-time testing techniques that handle dynamically allocated memory only.

4. Memory-Related Errors Handled

The following are examples of the kind of errors that have been caught successfully using this process, in particular using a prototype tool implemented as part of the optimizer module of a C compiler:

dereferencing of an invalid pointer variable;
array or pointer out-of-range access;
memory leaks;
invalid attempts to free invalid memory block;
dangling pointers;
passing invalid arguments to procedure calls.

5. Memory and Program Models

The specific examples and embodiments described make reference to the C programming language. However, it will be readily apparent to those skilled in the art in view of this disclosure that the embodiments of the invention can be implemented in any programing language using pointers.

5.1 Memory Model

The memory space is viewed as a set of "memory objects", M, comprising of all variables and heap-allocated objects. A new memory object is added to the set M whenever a new variable comes into scope or whenever memory is allocated dynamically. Similarly, a memory object is deleted from the set M whenever a variable goes out of scope or a heap-allocated memory block is deallocated.

Pointers pointing to a memory object are viewed as being "contained in" that memory object and "located at" the position within the memory object that the pointer is currently assigned to. However, the entire set of memory objects, M, is not of interest. The sets that are relevant for analysis are mentioned hereinafter. Consider P as a set of all pointer variables that are currently in the scope. A subset of the memory objects, e.g. the dynamically allocated heap objects, the address-taken variables and array variables are labelled as "Targets" (henceforth referred to as set T). This implies that a pointer variable may possibly point to these heap objects or variables. Depending on the implementation and the kind of errors that are to be tracked, the target entries can be enhanced to include other relevant information, including:

size of the array variable,
size of an allocated memory block,
a reference count to indicate how many pointers are pointing to this memory object, etc.

Another data structure called "Relations" (henceforth referred to as set R) describes the relationship between a pointer and a target (R=P×T). If a pointer 'p' is pointing to a memory object 'm', the set R has an entry for the relationship <p,m>. Thus, at any given program point, the set R reflects the status of the memory space with regards to the pointer—points to relationship.

The relations entry may further contain the following information to make the analysis and error-reporting more accurate and meaningful for a programmer:

the position of the pointer within the memory object, the line number at which a particular relation was created, etc., and flags to indicate which basic blocks are the source of this relation entry.

For sake of convenience in representation, names are assigned to the heap-allocated objects that would otherwise be unnamed. The name assigned to such an object is "heap_n", where 'n' is the statement number of the allocation statement. For example, if a call to a malloc statement is assigned to a variable at statement no. 12 in the program, an entry <p, heap_12> can be added into the set R. Some special values can also be defined to represent 'null' or 'invalid' pointer values during the analysis. For the naming of heap objects, a preferable naming convention is to include the name of the procedure containing this allocation. The unique name given to a heap-allocated object is "heap_<procedure name>_<statement_number>" (e.g., the entry in the relation table may read "<p, heap_foo_12>" instead of "<p, heap_12>").

5.2 Program Model

In the first embodiment, the main concern is with the behavior of a computer program and the program's effect on the memory space. Since the state of the memory space is modelled by the 3 sets P, T and R, the whole program can be viewed as a sequence of operations on these 3 sets. Each statement can be seen as updating, modifying, or performing a lookup on either of these sets. For instance, the following C assignment statement:

$$p=\&a;$$

where 'p' is of type int* and 'a' is of type int can be viewed as the operation of adding the variable 'a' into the Target set T, and adding the pointer relations <p,a> into the Relations set. Symbolically, the above assignment statement is equivalent to:

$$T=T U\{a\}$$

$$R=R-\{<p,x>:x\epsilon T\}U\{<p,a>\}.$$

That is, the current relationships of the variable 'p' are deleted from the set R, and then the new pair <p,a> is added to the set.

Similarly, a memory operation may involve a look-up on one of these sets. For example, for a pointer dereferencing operation on a pointer variable 'p', 'p' must point to a valid memory object. In the process according to the first embodiment, this is equivalent to performing a lookup on the set R for an entry 'p':

$$Lookup(R,\ <p,x>:x\epsilon T).$$

That is, look up the set R for a pair <p,x>, where p is the pointer variable in consideration and x is any valid target belonging to the set T.

The mapping between a statement in a program and the corresponding operations that this statement performs on these 3 sets is defined by the language semantics on how memory-related operations exactly affect the memory space. Moreover, the mapping also depends on the specific errors that are probed in a given debugging session.

5.3 The Analysis Procedure

The analysis proceeds by performing, at each statement, a static update or a lookup on these sets depending on the memory operations at that statement and depending on how the language defines the effects of a given operation on the memory space. As an example of how this technique is used to catch errors, an analysis is given for catching memory leak errors.

Firstly, the 'preconditions' must be identified that the programming statements should satisfy to avoid memory leaks. A memory leak may be said to occur when all references to a heap-allocated memory are lost, such that the memory cannot be reclaimed. This occurs when a local pointer variable goes out of scope without deallocating the memory block that the pointer is pointing to, or when a pointer variable pointing to a heap-allocated memory block is reassigned to another memory block without deallocating the first pointer, and in either case, if there is no other pointer variable pointing to this memory block. Thus, any assignment statement that assigns to a pointer variable 'p' should satisfy the following preconditions to avoid a memory leak at that statement:

1. the pointer variable p does not already point to a heap-allocated object; or
2. if the pointer variable p does, there should be another pointer variable pointing to the same memory block.

The same preconditions are required to hold when a pointer variable goes out of scope.

Table 5 contains an illustrative piece of program code, with the contents of the sets P, T and R shown at the right hand side. Note that although the return value of malloc can also be a Null pointer, that case has been omitted in this example for the sake of brevity. The effect of the analysis is the same even when the above fact is taken into consideration.

TABLE 5

| | |
|---|---|
| 1 main( ) | |
| 2 { | |
| 3  char*p; | P = {p}; T = { }; R = { } |
| 4  p = (char*)malloc(sizeof(char)); | P = {p}; T = {heap_4}; |
| | R = {<p, heap_4> created at stmt_4} |
| 5  p = (char*)malloc(sizeof(char)); | P = {p}; T = {heap_4, heap_5}; |
| | R = {<p,heap_5> created at stmt_5} |
| 6 } | |

In this example, since memory error leaks are being looked for, the preconditions mentioned above for statements 4, 5 and 6 of Table 5 must be verified. The preconditions are satisfied at statement 4, but not at statements 5 and 6. Hence, memory leaks occur at these two points. The statement number stored with the relations entry traces the origin of these errors to the allocation statements at statements 4 and 5, respectively.

6. Static Analysis Technique

Analysis of a program begins by analyzing the 'main' procedure, or in general, the root of the call graph.

6.1 Analysis of a Statement

Analysis of a statement involves the following statements:

Determine the list of preconditions for that statement. Preconditions of a statement are determined from the operations contained in the statement, language restrictions defined for such operations, and the errors that are probed for in a given run.

Verify whether the precondition holds at the given program statement Preconditions are in the form either of a logical expression whose validity needs to be established in the context of the given procedure, or of a lookup-query on the sets T or R, or a conjunction or disjunction of such expressions.

If the analyzer succeeds in proving that all the preconditions at a given statement hold, the statement can be assumed to be free of errors.

If the attempt to prove that the preconditions hold fails, the partially-evaluated precondition is either:
1. propagated as the precondition of the containing basic block; or
2. flagged off as an error, as stipulated by the error definitions.

As an example, if the precondition fails in the memory leak example discussed in section 5 above (see Table 5), the failed precondition has to be signalled as a memory leak error. On the other hand, if the precondition for a dereference operation cannot be proved to hold, the failed precondition should be propagated as the basic block's precondition. A basic block is a sequence of program statements, such that control enters at the first statement of the sequence and exits at the last sentence, without any intervening branches. Basic blocks form the modes of the Control Flow Graph—the data structure widely used for program analysis. It is possible that memory might be allocated for this pointer variable in another basic block.

If the partially evaluated precondition contains a variable whose scope begins with the containing basic block, an error is generated.

If the partially evaluated precondition contains a variable whose value is read in within the same basic block, and the value of that variable remains uninferred at this statement, run-time tests are generated on that variable.

The postconditions of the statement are derived and used to update the tables T and R. If the statement contains a procedure call, the postconditions of the callee procedure are used to update these tables as well.

Figure 9:
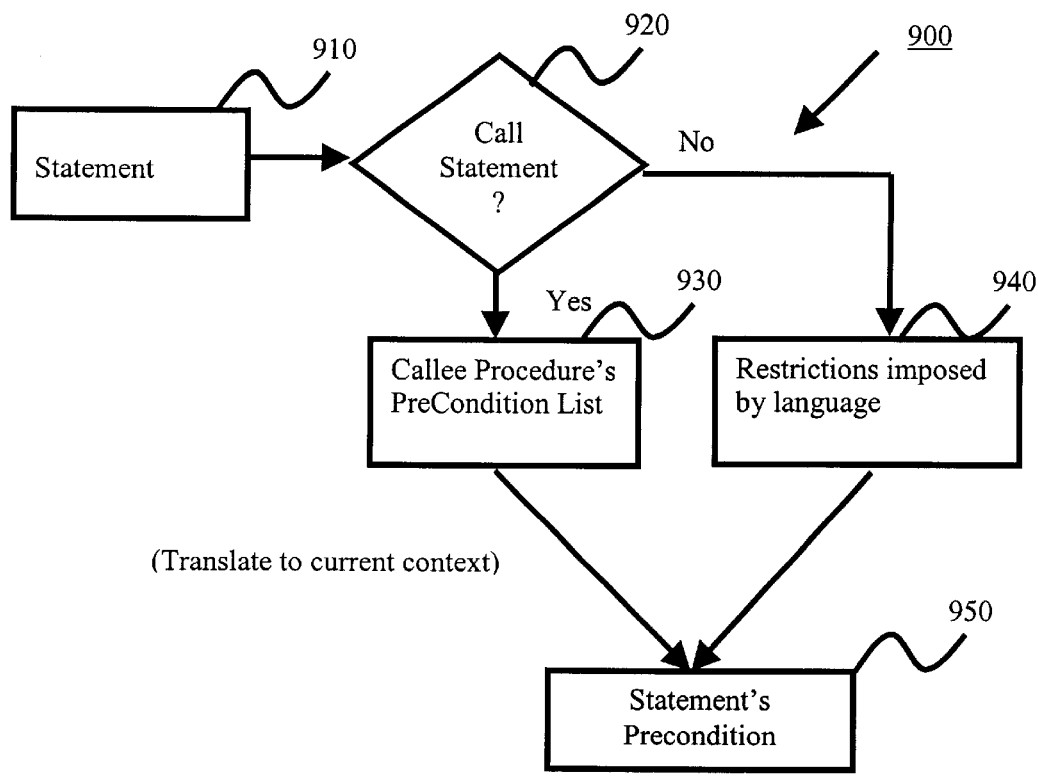
FIG. 9 is a flow diagram illustrating the process of analyzing a statement to derive a pre-condition.

FIG. 9 is a flow diagram illustrating the process 900 of analyzing a statement to derive a pre-condition. In step 910, a statement is processed for computation of preconditions. In decision block 920, a check is made to determine if the statement 910 is a call-statement. If decision block 920 returns true (YES), processing continues at step 930 and the callee procedure's postcondition list is used is used in step 930, before processing continues at step 950. Thus, for a call-statement, the callee procedure's precondition list is used. The preconditions of the callee procedure are translated to the current context and the resultant entries used to update the Target and the Relations table (e.g. for a procedure call foo(p), any precondition that the procedure foo has for its first parameter is translated to a precondition on the pointer 'p'). Otherwise, if decision block 930 returns false (NO), processing continues at step 940. In step 940, restrictions imposed by the language are used. Thus, for a statement that is not a call-statement, the preconditions of the statement are computed according to the restrictions that the language semantics impose on the operations present in the statement (e.g. for a C statement, *p=1, the precondition demands that the pointer 'p' points to a valid memory location). Processing then continues at step 950. In step 950, the statement's precondition is provided.

Figure 8:
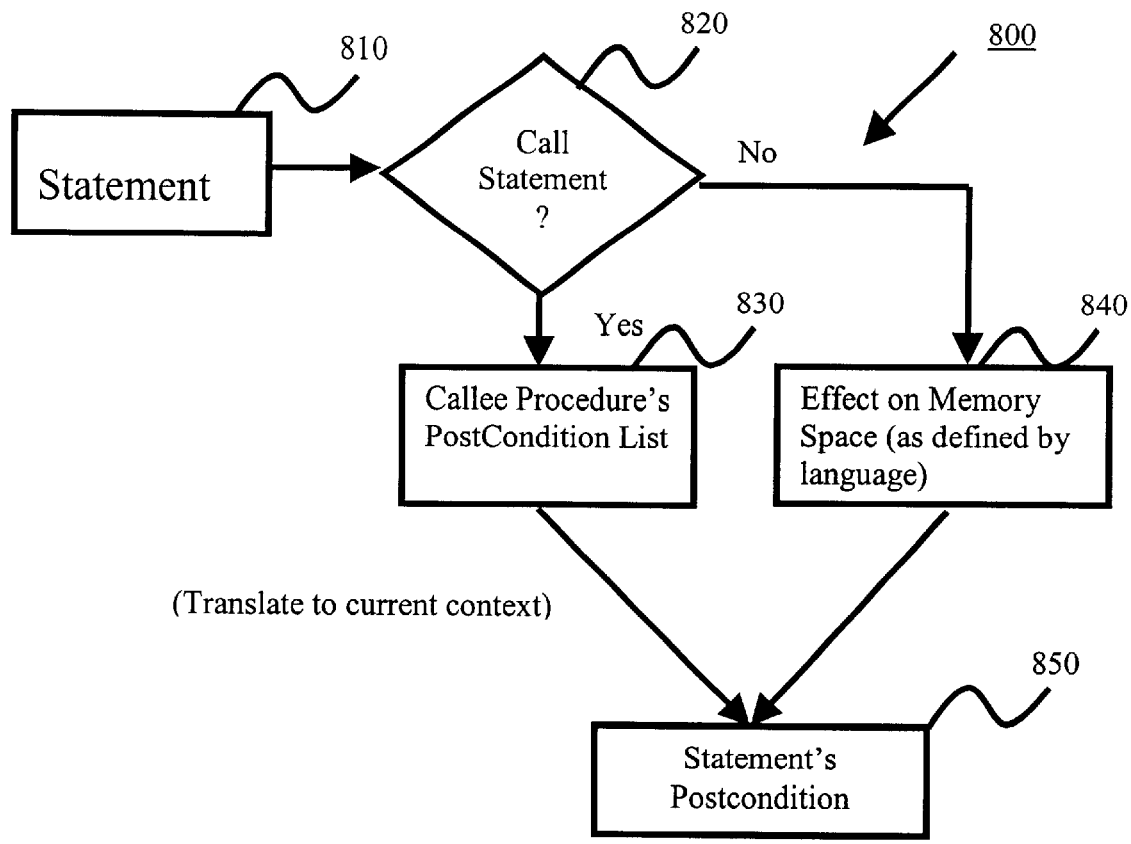
FIG. 8 is a flow diagram illustrating the process of analyzing a statement to derive a post-condition.

FIG. 8 is a flow diagram illustrating the process 800 of analyzing a statement to derive a post-condition. In step 810, a statement is processed for computation of postconditions. In decision block 820, a check is made to determine if the statement 810 is a call-statement. If decision block 820 returns true (YES), processing continues at step 830 and the callee procedure's postcondition list is used in step 830, before processing continues at step 850. In particular, the postconditions of the callee procedure are translated to the current context and the resultant entries used to update the Target and the Relations table. For example, the procedure 'foo' is assumed to have the statements:

```
{
int * temp;
...
temp = malloc(sizeof(int));
...
return temp
}.
```

The postcondition for the callee procedure foo( ) would contain an entry <(return_value, heap_n)>, indicating that the return value of the procedure points to a heap-allocated target. If the call site has a statement p=foo( ), step 830 adds an entry <(p,heap_n)> to the Relations table (i.e. "translating to current context" in FIG. 8—same applies in FIG. 9). <heap_n> is added to the Target table. The procedure postcondition describes the return value of the procedure. At the call-site, the return value is assigned to pointer 'p'. In effect, the procedure postcondition becomes true for the pointer 'p'.

Otherwise, if decision block 830 returns false (NO), processing continues at step 840. In step 840, the effect of the statement on the memory space (as defined by language semantics) is determined. For a statement 810 that is not a call-statement, the effect of the statement on the memory space is computed according to the language definitions 610. For example, for a C statement p=&a, the entry <a> is added to the Target table and the pair <(p,a)> is added to the Relations table. Processing then continues at step 850. In step 850, the statement's postcondition is provided.

6.2 Analysis of a Basic Block

Analysis of a basic block involves traversing all the statements in the basic block and analyzing each statement according to the technique discussed above. As mentioned before, those preconditions that cannot be proven to be valid and are not flagged off as errors are propagated as the basic block's preconditions. Similarly, at the end of the basic-block analysis, the contents of the relations table R are summarized as the basic block's postconditions.

Figure 7:
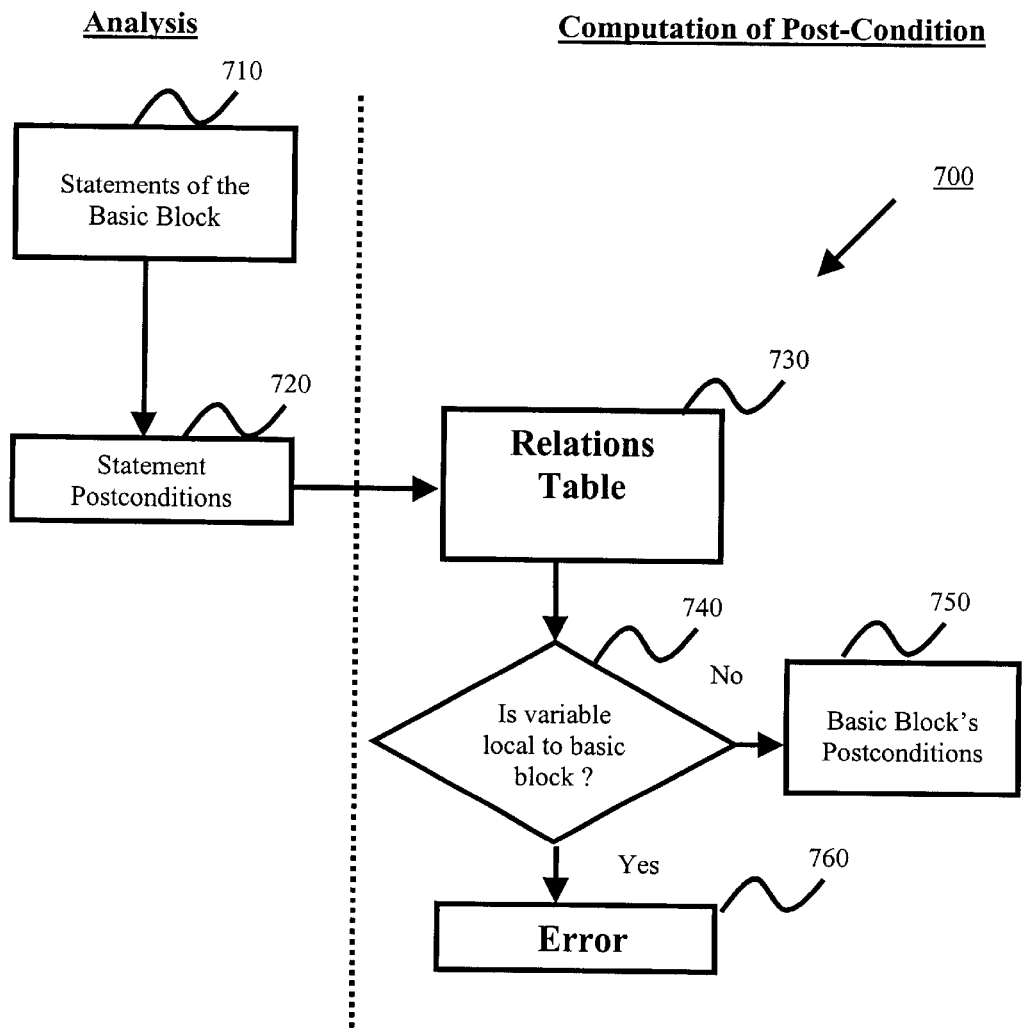
FIG. 7 is flow diagram summarizing the computation of a condition for a basic block.

FIG. 7 is flow diagram summarizing the computation of post conditions of a basic block. The computation of preconditions is analogous. In step 710, the statements of the basic block are analyzed. In step 720, the statement postconditions are produced. The dotted line in FIG. 7 indicates that the portion of the drawing to the left of the line indicates that data for the Relations Table 730 is coming from the analysis of the statement. The Relations Table 730 contains all the <pointer, target> relations off the basic block has been analyzed. Thus, in step 730, the Relations Table is provided. After the last statement of a basic block has been analyzed, the current contents of the relations table 730 are summarized as the basic-block-postconditions 750, which is later used in the inner-basic-block analysis phase. For this purpose, the entries of the Relations Table 730 are examined. In particular, a check is made in step 740 to see if the variable is local to the basic block. If for an entry <pointer, target> the scope of either variable pointer or target ends at this basic block (YES), then an error has to be flagged in step 760 for that variable (e.g., memory leak for the case when pointer runs out of scope, and dangling-pointer-error for the case when target runs out of scope). Thus, decision block 740 returns false (NO), the basic block's postconditions are produced. The other entries of the Relations table are summarized 750 as the basic block's postconditions.

6.3 Analysis of a Procedure

Analysis of a procedure involves two passes:

A forward pass in which the control flow graph of the procedure is traversed in the breadth-first order. Each basic block being traversed is analyzed and summarized in the manner discussed above.

A backward pass in which the control flow graph is traversed in a reverse breadth-first order. During this pass, preconditions of the basic block being traversed are propagated to the dominator basic blocks.

In the forward pass, before starting to analyze a basic block, the postconditions of all the predecessor basic blocks are carried forward to set R, so that this set reflects the current status of the memory space at this program point.

If a particular postcondition is carried forward from some but not all the predecessors, a flag in the relations data structure indicates the originating basic blocks for this postcondition. If this relations entry satisfies some precondition at a later statement, run-time tests must be run to ensure that during execution, control flows through the proper basic blocks that generate these required postconditions. Such postconditions are referred to as conditional postcondition. Conditional postconditions are described in more detail hereinafter.

If a particular postcondition is carried forward from all the predecessors, no information is stored about the originating basic block, because regardless of the execution control flow to this basic block, the necessary postcondition is generated. Such postconditions are referred to as unconditional postconditions.

The postconditions of all the basic blocks that contain an implicit or explicit exit from the procedure are merged and summarized as the procedure postconditions. Merging a postcondition means storing information about all those basic blocks where a given postcondition may originate from. In the backward pass, preconditions are propagated from basic blocks to their dominator basic blocks. During this propagation, information is maintained about the originating basic blocks for a precondition. Just as in the case of postconditions, conditional precondition and unconditional precondition can be defined. The precondition set of the entry basic block of the procedure is summarized as the procedure precondition.

As in the case of creation of a basic block's precondition sets, considerations about the scope of variables, etc., are used in flagging off errors or generating run-time tests. For example, suppose at the end of a procedure a relation <p,a> is found, where 'p' is a global pointer and 'a' is a variable local to this procedure. The postcondition of the procedure is modified to reflect <p, invalid>, because the address of the variable 'a' is not valid at the call-site.

6.4 Inter-procedural Analysis

At a procedure call-site, the preconditions and postconditions of a procedure are used for verifying whether the call to the procedure is valid, and for finding out the effects of the procedure on the memory space.

If the summary sets for the callee procedure are not available, and the source code for the callee procedure body is available, this procedure is analyzed first and the summary sets obtained.

For those procedures for which source code is not available, the user can provide the preconditions and postconditions to the analyzer, and the analysis proceeds in the usual manner. This feature also makes it possible to use this technique in an incremental manner, so that during any given compilation session, only those procedures are touched that have not already been analyzed.

If neither of the foregoing steps holds, then the analysis is not able to take into consideration the effects of this procedure call. This may result in in accuracy during the analysis.

A call statement can have two kinds of preconditions:

Preconditions derived directly from the expressions in the call statement;

Preconditions derived from the summary precondition set of the callee procedure, which can again be classified as:
1. Preconditions on parameters. In this case, these preconditions are verified for the expression that is passed as the actual parameter at the procedure call-site.
2. Preconditions on global variables.

Verification of these preconditions proceeds in the same way as for the usual preconditions mentioned above. Similarly, the postconditions of the callee procedure have to be translated into the current context and added into the relations table. The postconditions, too, are of different kinds:

Postconditions for return value: if the called procedure has a postcondition on return value and if at the call-site, the return value of the procedure is assigned to a variable, this creates a new relations entry for the assigned variable.

Postconditions for global variables.

Postconditions for parameters.

Recursive or mutually-recursive procedures can be handled by applying these procedures for a number of iterations until a fixed point is reached. Analysis of a given program begins at the 'main' procedure of the program or in the absence of the main procedure, at a procedure designated by the user for this purpose. The user may also choose to analyze only a few specified procedures in a given analysis session.

6.5 Handling Loops

Loops are handled much in the same way as other basic blocks are, except, that a number of loop-based analyses (e.g. range-propagation, etc.) must be performed to analyze the ranges of the array accesses within the loop.

Figure 4:
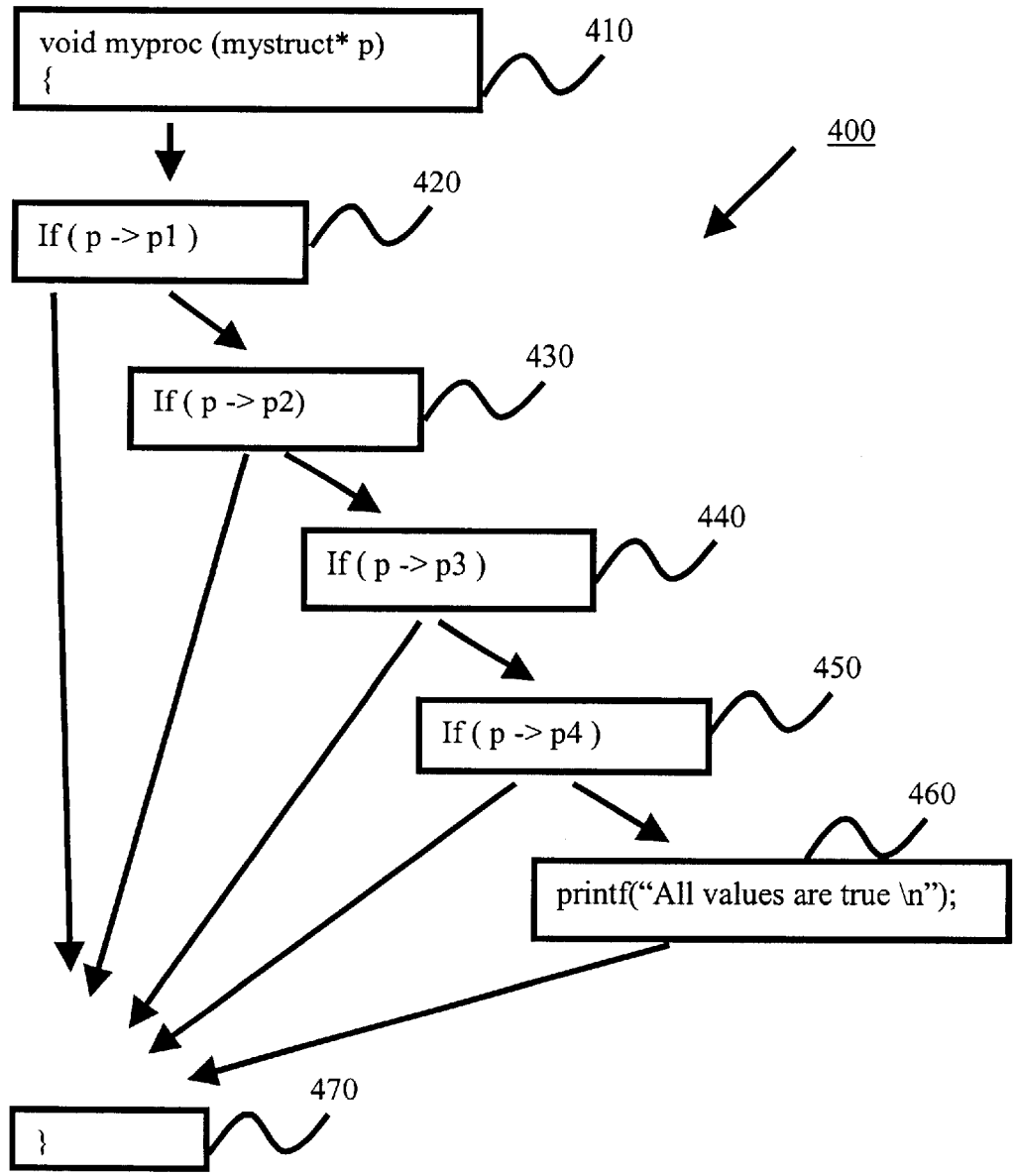
FIG. 4 is a schematic/block diagram of loop handling in accordance with a first embodiment of the invention.

A nested conditional statement is now described by way of example using the data structure and procedure of Table 1, which is discussed hereinafter with reference to FIG. 4. Analysis applied to the procedure myproc of Table 1, which is depicted graphically in FIG. 4.

The procedure 400 has a definition block 410 ("void myproc (mystruct\* p) {")or a basic block 0. From block 410, processing flows to the first statement 420 ("if (p->p1)") or the basic block 1. From block 420, forward flow passes to block 430 ("if(p->p2)"), or basic block 2, and to block 470 or basic block 6 ("}"). From block 430, forward flow passes to block 440 ("if(p->p3)"), or basic block 3, and to block 470. From block 440, forward flow passes to block 450 ("if(p->p4)"), or basic block 4, and to block 470. From block 450, forward flow passes to block 460 ("printf("All values are true \n");"), or basic block 5, and to block 470. From block 460, forward flow passes to block 470.

In the forward pass, each of the basic blocks 420–1450 have a precondition "p should point to valid memory object". In the backward pass, the precondition of block 450 or basic block 4 is merged with that of block 440 or basic block 3, since both basic blocks have the same precondition. The precondition of block 440 can be disregarded and just attached to block 440. Propagating in a similar fashion until the top is reached, finally this condition can be summarized as the precondition of the procedure "myproc" on the formal parameter 'p':"first parameter to myproc should have a valid entry in R".

Suppose a call site has the sequence of statements shown in Table 6.

TABLE 6

```
  {
1   mystruct *x, a;
2   x = &a;
3   myproc(x);
  }
```

Statement 2 of Table 6 adds an entry <x, a> in the table R. Now statement 3 has the precondition "first parameter to myproc should have a valid entry in R". This condition is satisfied due to the presence of entry <x, a> in R. Hence for the example shown in FIG. 4, no run-time test is required.

Table 7 contains a second example demonstrating an instance of how the dangling pointer problem is caught by this technique.

TABLE 7

```
1    char* proc_1( )
2    {
3      char a, *p;
3      p = &a;
4      return p;
6    }
7    void proc_2( )
8    {
9      char* x;
10     x = proc_1( );
11     *x = 'a';
12   }
```

In this example, the analysis of the procedure proc_1 summarizes the postcondition of this procedure as <return_value, a>. However, since 'a' is local to the scope of proc_1, this entry is further updated to <return_value, invalid>. During analysis of proc_2, statement 10 adds an entry <x, invalid> to the table R. Statement 11 requires a valid entry for 'x' to be present in R. However, the entry of x in R points to an invalid entry. Therefore, a pointer dereferencing error is flagged off at statement 11. Since the relation and postcondition entries store line numbers as well, the cause of the error can be exactly pinpointed to statement 5. The return value of the procedure is made to point to a variable that is local in scope to proc_1.

7. Further Details of the Technique 7.1 Keeping Track of Line Numbers of the Error The pointer-target relation data structure, as also the precondition and postcondition entries, contains a field that stores the line number where this relation, precondition or postcondition was created. When preconditions or postconditions are merged, the merged entry stores all the line numbers that contributed to this pre- or post-condition. Thus, during the course of an error analysis, the required information is available to report the line numbers of the statement that caused an error.

7.2 Handling Multiple Pointers

To handle multiple pointers, two extra fields are stored in the relations entry, in addition to the fields mentioned earlier. The two fields are:

Level of indirection of the pointer (referred to as level_ind), and

Position of the current level of pointer within the parent pointer (referred to as ptr_pos).

Searching for an entry for a multiple pointer in R is the same as searching for the entry for a single pointer, except that in this case the values of these two fields must be compared as well. Table 8 contains a C code fragment as an example.

TABLE 8

```
  {
1   char** dp;
2   dp = malloc(sizeof(char*)*10);
3   dp [1] = malloc(sizeof(char));
4   *dp[0] = 'a';
5   *dp[1] = 'b';
  }
```

In Table 8, dp is a double pointer. The set R contains relation entries for the symbol 'dp' with the following field values:

level_ind=0; ptr_pos=−1; added at the allocation statement on line 2.

level_ind=1; ptr_pos=1; added at the allocation statement on line 3.

The dereference statements at line nos 4 and 5 require relation entries with the following field values:

line 4: level_ind=1; ptr_pos=0; not present in R. ERROR, and line 5: level_ind=1; ptr_pos=1; present in R. NO ERROR.

7.3 Merging of Conditions to Generate Minimal Run-time Test

Since the main emphasis of the approach used in the embodiments of the invention is to minimize the extent of run-time testing, the process refrains from blindly inserting run-time tests into the source code. Consider the C code fragment given in Table 9.

TABLE 9

```
     void proc( )
     {
1      char a[100];
2      int n;
3      scanf("%d",&n);
4      a[n] = 1;
5      a[n + 10] = 2;
6      a[n + 20] = 3;
     }
```

A straightforward approach for validating the upper bound of the array access inserts run-time tests before each of the statements 4, 5 and 6. However, the analysis technique employed by the first embodiment merges the conditions required at each of these statements to arrive at the following final test shown in Table 10.

TABLE 10

```
     void proc( )
     {
1      char a[100];
2      int n;
3      scanf("%d",&n);
       if(n >= 80)
       {
         if (n >= 100) report error on lines 4, 5 and 6
         else if (n >= 90) report error on lines 5 and 6
         else report error on line 6
       }
4      a[n] = 1;
5      a[n + 10] = 2;
6      a[n + 20] = 3;
     }
```

In this case, for the case where the value of n lies in the range [0 . . . 80], only one test is carried out. Further tests are executed only if the value of n lies outside the range. Thus, this approach attempts to minimize the use of run-time tests to an irreducible minimum.

7.4 Using Flag Variables for the Inter-basic-block and Inter-procedural Analysis As mentioned hereinbefore, when conditions are propagated from some but not all of predecessor/successor blocks, information must be stored about which basic blocks did these conditions originate from. The process of the embodiments handles this aspect in the following manner:

- define temporary flag variables corresponding to each basic block. These variables are global in scope (so that they can be used at call-sites as well).
- all these flag variables are initialized to false. C compilers that initialize global variables to 0 do this automatically.
- at the end of each basic block, insert a statement that sets the flag variable corresponding to that basic block to true.

When using conditional preconditions or postconditions, run-time tests are generated to verify the values of these flag variables to ensure that control has flown through the proper path required. Again, a straightforward application of this approach generates many temporaries. However, these can be optimized out by generating temporary flag variables only in cases that require them, that is cases, where preconditions and postconditions are propagated conditionally.

Figure 5:
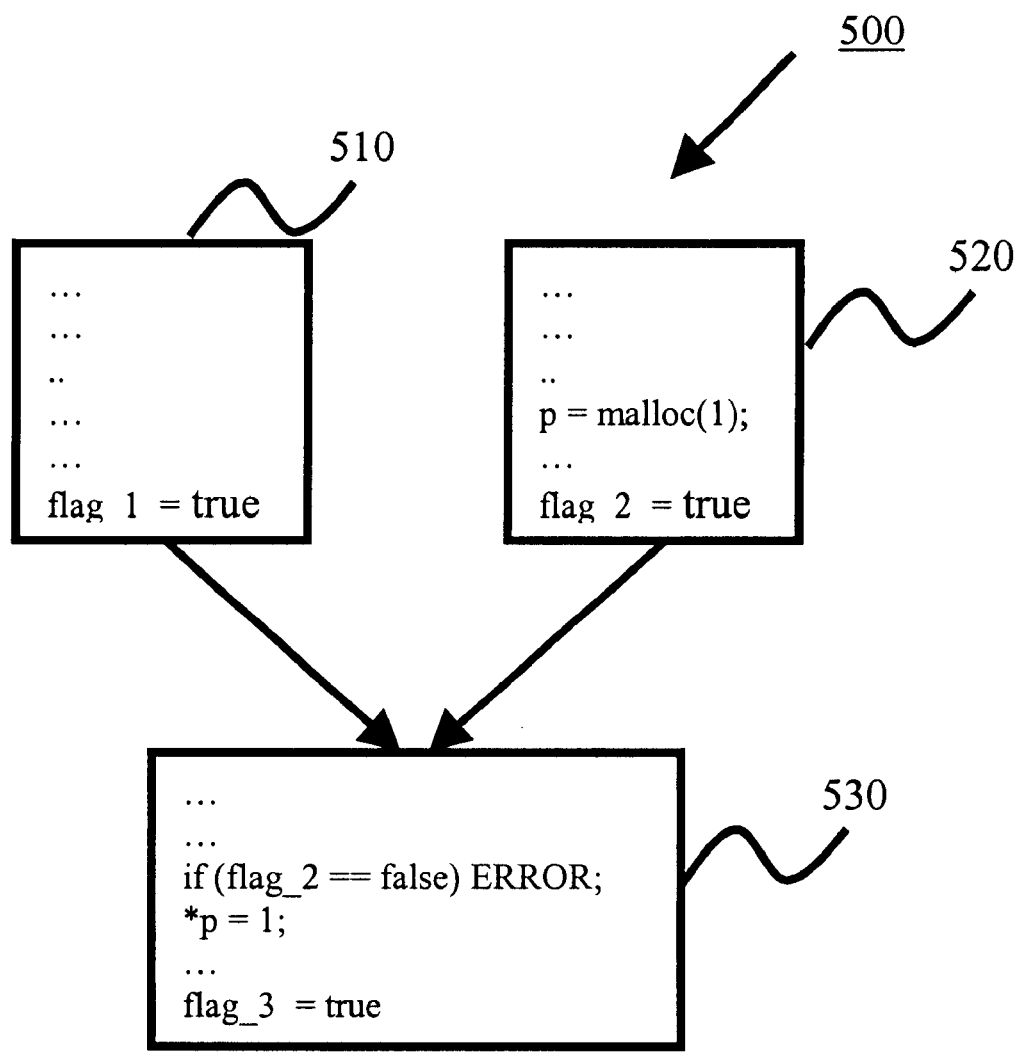
FIG. 5 is a schematic block diagram showing the use of flag variables across program blocks in accordance with a first embodiment of the invention.

FIG. 5 illustrates an example showing this point. In the drawing a first basic block 510 and a second basic block 520, each have pass forward to basic block 530. The first basic block 510 contains, amongst other things, an inserted statement "flag__1=true". The preceding statement is inserted by the method according to the embodiments of the invention to keep track of the control flow during actual program execution. The same applies for the statement "if (flag__z=false) ERROR". Basic block 520 has, amongst other things, statements "p=malloc(1); . . . flag__2=true". Basic block 530 has the following statements "if (flag__2=false) ERROR; *p=1; flag__3=true;". This example uses flag variables to propagate conditions across basic blocks. Since memory for pointer 'p' is allocated in basic block 520 only, the test "if (flag__2=false) ERROR" in basic block 530 ensures that the access "*p=1" in basic block 530 is valid only if control has flown through basic block 520. In this example, flag__1 of basic block 510 is optimized out, since the value assigned to the flag variable is not used anywhere.

7.5 Merging of Preconditions and Postconditions

When propagating preconditions and postconditions across basic blocks, more than one basic block may produce the same condition. Hence, conditions may be merged while propagating. Rules are presented for propagating preconditions to the dominator basic block. The case for postcondition is similar (with the direction of propagation reversed, using postdominators).

This is now discussed by way of an example. Let B be a basic block, and let B1, B2 . . . Bn be the basic blocks for which B is a dominator. Consider propagating a precondition from the basic block B1 to the dominator block B.

i) Suppose B1 has a precondition P1 and B has a precondition P, such that, P=>P1 (i.e. the precondition P1 follows from the precondition P), then P1 does not need to be propagated to B, since the stronger. condition at P ensures P1 (this subsumes the case when P=P1). For example, if B requires the range of a variable n to be [0 . . . 100] and B1 requires the range of the same variable as [0 . . . 50], this precondition does not need to be propagated to B.

ii) In the above section, if P1=>P, the precondition is propagated. However, the amount of run-time testing can be reduced as explained in section 7.3.

iii) If more than one of the blocks B1, . . . , Bn contain the same precondition, the precondition can be carried over to the dominator. The propagated precondition stores a list of flag-variables of all those basic blocks from where this precondition originated.

Besides the foregoing, logical simplification of the precondition and postcondition expressions can be carried out as required while merging.

8. Computer Implementation

The embodiments of the invention are preferably implemented using a general-purpose computer. In particular, the processing or functionality of FIGS. 1–5 can be implemented as software, or a computer program, executing on the computer. The method or process steps for detecting memory-related errors in a computer program during compiling of the computer program are effected by instructions in the software that are carried out by the computer. Similarly, the method or process steps for compiling a computer program are effected in this manner. The software may be implemented as one or more modules for implementing the process steps. A module is a part of a computer program that usually performs a particular function or related functions. Also, as described hereinbefore, a module can also be a packaged functional hardware unit for use with other components or modules.

In particular, the software may be stored in a computer readable medium; including the storage devices described below. The software is preferably loaded into the computer from the computer readable medium and then carried out by the computer. A computer program product includes a computer readable medium having such software or a computer program recorded on it that can be carried out by a computer. The use of the computer program product in the computer preferably effects advantageous apparatuses for detecting memory-related errors in a computer program during compiling of the computer program and for compiling a computer program in accordance with the embodiments of the invention.

Preferably, a computer system consists of the computer, a video display, and input devices. In addition, the computer system can have any of a number of other output devices including line printers, laser printers, plotters, and other reproduction devices connected to the computer. The computer system can be connected to one or more other computers via a communication interface using an appropriate communication channel such as a modem communications path, a computer network, or the like. The computer network may include a local area network (LAN), a wide area network (WAN), an Intranet, and/or the Internet.

The computer itself consists of a central processing unit(s) (simply referred to as a processor hereinafter), a memory which may include random access memory (RAM) and read-only memory (ROM), input/output (IO) interfaces, a video interface, and one or more storage devices. The storage device(s) can consist of one or more of the following: a floppy disc, a hard disc drive, a magneto-optical disc drive, CD-ROM, magnetic tape or any other of a number of non-volatile storage devices well known to those skilled in the art. Each of the components is typically connected to one or more of the other devices via a bus that in turn can consist of data, address, and control buses.

The video interface is connected to the video display and provides video signals from the computer for display on the video display. User input to operate the computer can be provided by one or more input devices. For example, an operator can use the keyboard and/or a pointing device such as the mouse to provide input to the computer.

The system is simply provided for illustrative purposes and other configurations can be employed without departing from the scope and spirit of the invention. Computers with which the embodiment can be practiced include IBM-PC/ATs or compatibles, one of the Macintosh (TM) family of PCs, Sun Sparcstation (TM), a workstation or the like. The foregoing is merely exemplary of the types of computers with which the embodiments of the invention may be practiced. Typically, the processes of the embodiments, described hereinafter, are resident as software or a program recorded on a hard disk drive as the computer readable medium, and read and controlled using the processor. Intermediate storage of the program and intermediate data and any data fetched from the network may be accomplished using the semiconductor memory, possibly in concert with the hard disk drive.

In some instances, the program may be supplied to the user encoded on a CD-ROM or a floppy disk, or alternatively could be read by the user from the network via a modem device connected to the computer, for example. Still further, the software can also be loaded into the computer system from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

In the foregoing manner, a method, an apparatus, and a computer program product for detecting memory-related errors in a computer program during compiling of the computer program are disclosed. Further, a method, an apparatus, and a computer program product for compiling a computer program are disclosed. While only a small number of embodiments are described, it will be apparent to those skilled in the art in view of this disclosure that numerous changes and/or modifications can be made without departing from the scope and spirit of the invention.

We claim:

1. A method of detecting memory-related errors in a computer program during compiling of said computer program, said method including the steps of:
    performing static analysis upon a computer program, wherein the static analysis is performed concurrently with performance of compiler optimization and includes the steps of:
        assigning pre-conditions for respective statements in said computer program, wherein such a pre-condition must be satisfied in order for the computer program to execute without producing memory-related errors; and
        evaluating whether said pre-conditions are satisfied in said computer program, wherein the static analysis uses certain data structures and analysis also used in the concurrent performance of the compiler optimization;
    reporting, during compiling of said computer program, presence or absence of a memory-related error in said computer program if said evaluation is successful in determining whether such a pre-condition is satisfied;
    generating computer code, during compiling of said computer program, wherein the generated computer code includes a test for run-time detection of a memory-related error in said computer program if said evaluation of such a pre-condition is indeterminate; and
    producing compiled object code responsive to the computer program and the generated computer code including the test, so that execution of the compiled object code performs the test for run-time detection of a memory-related error and so that if the evaluation indicates one of the pre-conditions is satisfied the reporting of the presence or absence of a memory-related error reduces the run-time detection of memory-related errors in the compiled object code.

2. The method according to claim 1, wherein at least one of said pre-conditions is a test for checking a memory access in said computer program.

3. The method according to claim 2, further including the step of determining an interrelationship between two or more memory accesses using said static analysis.

4. The method according to claim 3, further including the step of generating a single condition in said computer program for two or more related memory accesses to minimize the number of conditions to be evaluated.

5. The method according to claim 2, wherein said memory access is made in statically allocated memory or dynamically allocated memory.

6. The method according to claim 1, wherein the step of evaluating whether the pre-conditions are satisfied includes the steps of:
    determining post-conditions, wherein such a post-condition includes an effect generated by a respective program statement on memory space; and
    verifying for one such program statement whether any precondition of that one program statement is satisfied in a context of the post-conditions determined for program statements preceding the one program statement.

7. The method according to claim 6, wherein such a pre-condition depends on one of the following:
    a memory-related operation in a statement in said computer program;
    a language restriction imposed on said memory-related operation;
    a predetermined error capable of being tested for; and
    a set of pre-conditions for a procedure call, said set being derived from static analysis of source code for said called procedure or being defined by a user.

8. The method according to claim 6, where said post-condition depends on one of the following:
    a memory-related operation at said statement of said computer program;
    the effect of said memory-related operation on said memory space defined by language semantics; and
    a set of post-conditions for a procedure call, said set being derived from static analysis of source code for said called procedure or being defined by a user.

9. The method according to claim 1, wherein such a pre-condition is indeterminate if a determination cannot be made based on compile-time information as to whether the pre-condition is satisfied.

10. An apparatus for detecting memory-related errors in a computer program during compiling of said computer program, said apparatus including:
    means for performing static analysis upon a computer program, wherein the static analysis is performed concurrently with performance of compiler optimization and includes the steps of;
    means for assigning pre-conditions for respective statements in said computer program, wherein such a precondition must be satisfied in order for the computer program to execute without producing memory-related errors; and means for evaluating whether said pre-conditions are satisfied in said computer program, wherein the static analysis uses certain data structures and analysis also used in the concurrent performance of the compiler optimization;

means for reporting, during compiling of said computer program, presence or absence of a memory-related error in said computer program if said evaluation is successful in determining whether such a pre-condition is satisfied;

means for generating computer code, during compiling of said computer program, wherein the generated computer code includes a test for run-time detection of a memory-related error in said computer program if said evaluation of such a pre-condition is indeterminate; and means for producing compiled object code responsive to the computer program and the generated computer code including the test, so that execution of the compiled object code performs the test for run-time detection of a memory-related error and so that if the evaluation indicates one of the pre-conditions is satisfied the reporting of the presence or absence of a memory-related error reduces the run-time detection of memory-related errors in the compiled object code.

11. The apparatus according to claim 10, wherein at least one of said pre-conditions is a test for checking a memory access in said computer program.

12. The apparatus according to claim 11, further including means for determining an interrelationship between two or more memory accesses using said static analysis.

13. The apparatus according to claim 12, further including means for generating a single condition in said computer program for two or more related memory accesses to minimize the number of conditions to be evaluated.

14. The apparatus according to claim 11, wherein said memory access is made in statically allocated memory or dynamically allocated memory.

15. The apparatus according to claim 10, wherein the means for evaluating whether the pre-conditions are satisfied includes:

means for determining post-conditions, wherein such a post-condition includes an effect generated by a respective program statement on memory space; and means for verifying for one such program statement whether any precondition of that one program statement is satisfied in a context of the post-conditions determined for program statements preceding the one program statement.

16. The apparatus according to claim 15, wherein such a pre-condition depends on one of the following:

a memory-related operation in a statement in said computer program;

a language restriction imposed on said memory-related operation;

a predetermined error capable of being tested for; and a set of pre-conditions for a procedure call, said set being derived from static analysis of source code for said called procedure or being defined by a user.

17. The apparatus according to claim 15, where said post-condition depends on one of the following:

a memory-related operation at said statement of said computer program;

the effect of said memory-related operation on said memory space defined by language semantics; and a set of post-conditions for a procedure call, said set being derived from static analysis of source code for said called procedure or being defined by a user.

18. The apparatus according to claim 10, wherein such a pre-condition is indeterminate if a determination cannot be made based on compile-time information as to whether the pre-condition is satisfied.

19. A computer program product having a computer readable medium having a computer program recorded therein for detecting memory-related errors in a computer program during compiling of said computer program, said computer program product including:

computer program code means for performing static analysis upon a computer program, wherein the static analysis is performed concurrently with performance of compiler optimization and includes the steps of;

computer program code means for assigning pre-conditions for respective statements in said computer program, wherein such a pre-condition must be satisfied in order for the computer program to execute without producing memory-related errors; and computer program code means for evaluating whether said pre-conditions are satisfied in said computer program, wherein the static analysis uses certain data structures and analysis also used in the concurrent performance of the compiler optimization;

computer program code means for reporting, during compiling of said computer program, the presence or absence of a memory-related error in said computer program if said evaluation is successful in determining whether such a pre-condition is satisfied;

computer program code means for generating computer code, during compiling of said computer program, wherein the generated computer code includes a test for run-time detection of a memory-related error in said computer program if said evaluation of such a pre-condition is indeterminate; and computer program code means for producing compiled object code responsive to the computer program and the generated computer code including the test, so that execution of the compiled object code performs the test for run-time detection of a memory-related error and so that if the evaluation indicates one of the pre-conditions is satisfied the reporting of the presence or absence of a memory-related error reduces the run-time detection of memory-related errors in the compiled object code.

20. The computer program product according to claim 19, wherein at least one of said pre-conditions is a test for checking a memory access in said computer program.

21. The computer program product according to claim 20, further including computer program code means for determining an interrelationship between two or more memory accesses using said static analysis.

22. The computer program product according to claim 21, further including computer program code means for generating a single condition in said computer program for two or more related memory accesses to minimize the number of conditions to be evaluated.

23. The computer program product according to claim 20, wherein said memory access is made in statically allocated memory or dynamically allocated memory.

24. The computer program product according to claim 19, wherein the computer program code means for evaluating whether the pre-conditions are satisfied includes:

computer program code means for determining post-conditions, wherein such a post-condition includes an effect generated by a respective program statement on memory space; and computer program code means for verifying for one such program statement whether any pre-condition of that one program statement is satisfied in a context of the post-conditions determined for program statements preceding the one program statement.

25. The computer program product according to claim 24, wherein such a pre-condition depends on one of the following:
   a memory-related operation in a statement in said computer program;
   a language restriction imposed on said memory-related operation;
   a predetermined error capable of being tested for; and
   a set of pre-conditions for a procedure call, said set being derived from static analysis of source code for said called procedure or being defined by a user.

26. The computer program product according to claim 24, where said post-condition depends on one of the following:
   a memory-related operation at said statement of said computer program;
   the effect of said memory-related operation on said memory space defined by language semantics; and
   a set of post-conditions for a procedure call, said set being derived from static analysis of source code for said called procedure or being defined by a user.

27. The computer program product according to claim 19, wherein such a pre-condition is indeterminate if a determination cannot be made based on compile-time information as to whether the pre-condition is satisfied.

28. A method of compiling a computer program, said method including the steps of:
   converting source code of said computer program into intermediate code of said computer program;
   optimizing said intermediate code of said computer program, said optimizing step including the steps of:
      detecting memory-related errors in said intermediate code of said computer program using static analysis;
      reporting any memory-related errors in said computer program that are determinate during compiling of said computer program;
      generating computer code to test for any memory-related errors in said computer program that are indeterminate during compiling of said computer program;
      incorporating said generated computer code in optimized intermediate code of said computer program; and
   converting said optimized intermediate code into compiled machine executable code of said computer program.

29. The method according to claim 28, wherein said detecting step further includes the steps of:
   performing static analysis upon said intermediate code of said computer program;
   computing at least one condition in said intermediate code of said computer program dependent upon said static analysis; and
   evaluating the validity of said at least one condition in said intermediate code of said computer program.

30. The method according to claim 28, wherein said at least one condition checks for a memory access in said computer program.

31. The method according to claim 30, further including the step of determining an interrelationship between two or more memory accesses using said static analysis.

32. The method according to claim 31, further including the step of generating a single condition in said intermediate code of said computer program for two or more related memory accesses to minimize the number of conditions to be evaluated.

33. The method according to claim 28, wherein said at least one condition is selected from the group consisting of a pre-condition, a post-condition, and a combination of a pre-condition and a post-condition.

34. The method according to claim 33, further including the step of assigning to each statement in said computer program at least one pre-condition that must be satisfied for said computer program to execute without said memory-related errors.

35. The method according to claim 33, wherein said post-condition is a check on the effect of a statement of said computer program on a memory space.

36. The method according to claim 28, wherein a condition is determinate if said condition is valid or invalid.

37. An apparatus for compiling a computer program, said apparatus including:
   means for converting source code of said computer program into intermediate code of said computer program;
   means for optimizing said intermediate code of said computer program, said optimizing means including:
      means for detecting memory-related errors in said intermediate code of said computer program using static analysis;
      means for reporting any memory-related errors in said computer program that are determinate during compiling of said computer program; and
      means for generating computer code to test for any memory-related errors in said computer program that are indeterminate during compiling of said computer program;
      means for incorporating said generated computer code in optimized intermediate code of said computer program; and
   means for converting said optimized intermediate code into compiled machine executable code of said computer program.

38. The apparatus according to claim 37, wherein said detecting means further includes:
   means for performing static analysis upon said intermediate code of said computer program;
   means for computing at least one condition in said intermediate code of said computer program dependent upon said static analysis; and
   means for evaluating the validity of said at least one condition in said intermediate code of said computer program.

39. The apparatus according to claim 37, wherein said at least one condition checks for a memory access in said computer program.

40. The apparatus according to claim 39, further including means for determining an interrelationship between two or more memory accesses using said static analysis.

41. The apparatus according to claim 40, further including means for generating a single condition in said intermediate code of said computer program for two or more related memory accesses to minimize the number of conditions to be evaluated.

42. The apparatus according to claim 37, wherein said at least one condition is selected from the group consisting of a pre-condition, a post-condition, and a combination of a pre-condition and a post-condition.

43. The apparatus according to claim 42, further including means for assigning to each statement in said computer program at least one pre-condition program that must be satisfied for said computer program to execute without said memory-related errors.

44. The apparatus according to claim 42, wherein said post-condition is a check on the effect of a statement of said computer program on a memory space.

45. The apparatus according to claim 37, wherein a condition is determinate if said condition is valid or invalid.

46. A computer program product having a computer readable medium having a computer program recorded therein for compiling a computer program, said computer program product including:
  computer program code means for converting source code of said computer program into intermediate code of said computer program;
    computer program code means for optimizing said intermediate code of said computer program, said optimizing means including:
    computer program code means for detecting memory-related errors in said intermediate code of said computer program using static analysis;
    computer program code means for reporting any memory-related errors in said computer program that are determinate during compiling of said computer program; and
    computer program code means for generating computer code to test for any memory-related errors in said computer program that are indeterminate during compiling of said computer program;
    computer program code means for incorporating said generated computer code in optimized intermediate code of said computer program; and
  computer program code means for converting said optimized intermediate code into machine executable code of said computer program.

47. The computer program product according to claim 46, wherein said computer program code means for detecting further includes:
  computer program code means for performing static analysis upon said intermediate code of said computer program;
  computer program code means for computing at least one condition in said intermediate code of said computer program dependent upon said static analysis; and
  computer program code means for evaluating the validity of said at least one condition in said intermediate code of said computer program.

48. The computer program product according to claim 46, wherein said at least one condition checks for a memory access in said computer program.

49. The computer program product according to claim 48, further including computer program code means for determining an interrelationship between two or more memory accesses using said static analysis.

50. The computer program product according to claim 49, further including computer program code means for generating a single condition in said intermediate code of said computer program for two or more related memory accesses to minimize the number of conditions to be evaluated.

51. The computer program product according to claim 46, wherein said at least one condition is selected from the group consisting of a pre-condition, a post-condition, and a combination of a pre-condition and a post-condition.

52. The computer program product according to claim 51, further including computer program code means for assigning to each statement in said computer program at least one pre-condition that must be satisfied for said computer program to execute without said memory-related errors.

53. The computer program product according to claim 51, wherein said post-condition is a check on the effect of a statement of said computer program on a memory space.

54. The computer program product according to claim 46, wherein a condition is determinate if said condition is valid or invalid.

* * * * *